UNITED STATES PATENT OFFICE.

THOMAS TWYNAM, OF LONDON, ENGLAND.

PROCESS OF SEPARATING TIN FROM IRON OR STEEL.

SPECIFICATION forming part of Letters Patent No. 491,254, dated February 7, 1893.

Application filed September 29, 1892. Serial No. 447,350. (No specimens.)

*To all whom it may concern:*

Be it known that I, THOMAS TWYNAM, a subject of Her Majesty the Queen of Great Britain, residing at Bedford Park, Chiswick, London, in the county of Middlesex, England, have invented certain new and useful Improvements in Processes of Separating Tin from Iron or Steel; and I do hereby declare that the following is a full, clear, and exact description of the invention, which will enable others skilled in the art to which it appertains to make and use the same.

My invention relates to a process for separating tin from iron or steel, and is particularly applicable for recovering the tin from tin plate scrap or cuttings, or old tin scrap which has been worked up into tin cans or the like. By my process also the iron after the tin has been separated from it can be re-used in metallurgical operations, more especially for scrap in the Siemens process of steel making.

My process consists in dipping the scrap to be treated into an aqueous solution of chloride of calcium or like material which will adhere thereto, and which I prefer should be thickened somewhat by adding a slight percentage of some glutinous substance, such as gum, then removing the material and placing it in a furnace and heating it to a red heat, and finally allowing the heated metal to fall or be deposited in a water bath in which the oxide formed will separate from the main mass of metal.

In practice I have found that a very suitable film can be formed by a solution containing thirty per cent of chloride of calcium and from two to three per cent of gum. I do not however confine myself to these materials or proportions, as a somewhat stronger or weaker solution does nearly as well, as will also certain other substances such as the alkaline chlorides, sulphates and nitrates.

When handling large quantities of the scraps, I prefer to charge it into a crate which may be lowered into the solution contained in a tank. From three to five minutes is usually sufficient time for the scrap to remain in the solution. If there be much grease or oil on the scrap it is well to add a little lime to the solution of the chloride, as a more alkaline solution is thereby formed, and the solution will be better able to form the wished for film over the surface of the scrap. The scrap with the adhering film on its surface is then removed to a suitable furnace in which it can be heated to a red heat. From ten to fifteen minutes heating at a dull to full red heat is usually long enough. A slightly oxidizing atmosphere should be maintained in the furnace, but the heat should not be too high, nor should a very strongly oxidizing atmosphere be maintained, as otherwise a large quantity of iron or steel will oxidize with the tin, and this should be avoided as far as possible. The scrap being heated sufficiently is withdrawn from the furnace and without cooling is allowed to fall into a tank of water, in which the film of oxide which has formed on the surface of the scrap at once falls off, sinking to the bottom of the tank. The stripped scrap can then be removed from the tank. It will be found that the surface is practically free from tin, although analysis may show a small amount still remains with it, but, as a rule not in sufficient quantity to prevent its use in steel melting, or for other purposes. The insoluble oxide which is left in the washing tank, together with the scale which has fallen off in the furnace and which should also be washed, will be found to contain the greater part of the tin originally present on the scrap, in the state of oxide mixed with more or less oxide of iron. This latter may be removed from the tin oxide, if so wished, by treatment with moderately strong acid, which will dissolve the iron or steel oxides without affecting the tin oxide which may be sold as such, or smelted in the usual way. Or in lieu of the acid treatment the tin oxide may be separated by treating with say caustic soda or other alkaline salt, in which case the iron oxide is left insoluble on treatment with water.

What I claim is:—

1. The hereinbefore described process for separating tin from iron or steel, which consists in first coating the surface of the tin, then heating the combined metals until the tin is oxidized, and then separating the oxidized from the unoxidized metal in a water bath, substantially as set forth.

2. The hereinbefore described process for separating tin from iron or steel, which consists in first coating the surface of the tin, then heating the combined metals until the tin is oxidized, then separating the oxidized from the unoxidized metal in a water bath, and finally separating the oxide of iron from the oxide of tin, substantially as set forth.

3. The hereinbefore described process for separating tin from iron or steel, which consists in first coating the tin with a film which when heated will form a scale capable of being separated from the iron or steel, then heating until the scale is formed, and then separating the tin-containing scale from the iron or steel, substantially as described.

In testimony whereof I have hereunto set my hand in the presence of two subscribing witnesses.

THOMAS TWYNAM.

Witnesses:
PHILIP M. JUSTICE,
ALLEN PARRY JONES.